United States Patent [19]

Hillinger et al.

[11] 4,367,598
[45] Jan. 11, 1983

[54] THERMAL TREATMENT APPARATUS FOR BULK MATERIAL

[75] Inventors: Bruno Hillinger, Hinterbruhl; Georg Bechmann, Vienna, both of Austria

[73] Assignee: Waagner-Biro Aktiengesellschaft, Austria

[21] Appl. No.: 161,382

[22] Filed: Jun. 20, 1980

[30] Foreign Application Priority Data

Jun. 25, 1979 [AT] Austria ................................. 4422/79

[51] Int. Cl.³ ............................................. F26B 17/26
[52] U.S. Cl. ..................................... 34/164; 34/57 A; 198/752; 198/771; 198/952; 406/75
[58] Field of Search ............... 432/134, 135, 146, 148; 406/75, 88, 89; 34/57 A, 164; 198/952, 771, 752

[56] References Cited

U.S. PATENT DOCUMENTS 3,387,590 6/1968 Bishop ................................ 34/57 A
3,469,672 9/1969 Stutske et al. ...................... 198/771
3,543,414 12/1970 Gomarin ............................ 34/57 A
3,585,732 6/1971 Itahashi .............................. 34/57 A
3,893,426 7/1975 Bryers ................................ 110/245

FOREIGN PATENT DOCUMENTS 1136642 9/1962 Fed. Rep. of Germany ........ 406/75
1951541 11/1977 Fed. Rep. of Germany ...... 198/771

Primary Examiner—Larry I. Schwartz
Attorney, Agent, or Firm—Steinberg & Raskin

[57] ABSTRACT

Apparatus for drying or cooling bulk material of the type which includes a vibratory conveyor through which the bulk material is transported includes the improvement wherein a plurality of partition members are provided in the conveyor so as to define between them a plurality of channels, the partition members preferably having fin-tube configurations whereby the same carry a thermal transfer fluid for facilitating the heat treatment of the bulk material. Apparatus for screening the fine portion of the bulk material is provided in the channels which preferably narrow in the direction in which the bulk material is transported so that the fine portion of the material receives less thermal treatment.

3 Claims, 3 Drawing Figures

THERMAL TREATMENT APPARATUS FOR BULK MATERIAL

BACKGROUND OF THE INVENTION

This invention relates generally to apparatus for thermally treating bulk material such, for example, as lime or coal, and, more particularly, relates to such thermal treatment apparatus which includes a vibratory conveyor through which the bulk material is transported.

Generally, in vibratory conveyor type thermal treatment apparatus of the type described above and where, for example, the bulk material is to be dried, the height of the bed of bulk material is limited which, accordingly, limits the specific efficiency of the particular thermal treatment apparatus.

SUMMARY OF THE INVENTION

Accordingly, one object of the present invention is to provide new and improved thermal treatment apparatus for drying or cooling bulk material.

Another object of the present invention is to provide new and improved thermal treatment apparatus for drying or cooling bulk material having an increased throughput capacity which is accomplished on the one hand by increasing the height of the bulk material bed and on the other hand through the control of the duration of contact of the bulk material with the thermal treatment apparatus via the provision of a defined lateral movement for the bulk material.

Briefly, in accordance with the present invention, these and other objects are attained by providing a vibratory conveyor in which a plurality of partition members are arranged which extend in the direction in which the bulk material is transported and which subdivide the conveyor into a corresponding plurality.

Preferably, the partition members each have a wavy configuration defined by vertically alternating protruding and depressed portions which extend in the transport direction. In the illustrated embodiment, the partition members are constructed as "fintube" heat exchange walls.

It has also been found preferable to arrange the partition members in a manner such that the protruding and depressed portions of each pair of opposed partition members are disposed in displaced relation to one another.

According to another feature of the invention, filtering apparatus are provided in the channels defined between the partition members in the vibratory conveyor by which the fine portions of the bulk material are screened. Further, the partition members are preferably arranged in a manner such that the cross-section of the channels in a plane transverse to the transport direction of bulk material decreases in that transport direction, i.e., the channels narrow in the transport direction and in accordance with the drying or filtering process which also proceeds in that transport direction.

DESCRIPTION OF THE DRAWINGS

A more complete appreciation of the present invention and many of the attendant advantages thereof will be better understood by reference to the following detailed description when considered in connection with the accompanying drawings in which.

DESCRIPTION OF THE PREFERRED EMBODIMENTS

Figure 1:
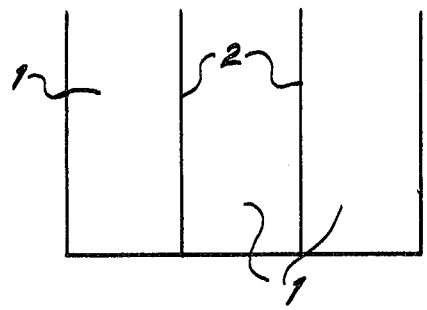
FIG. 1 is a transverse section view of a vibratory conveyor according to the present invention.
Figure 2:
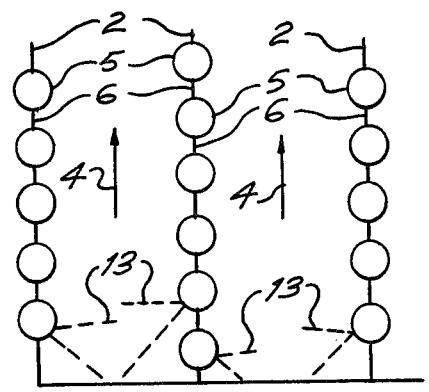
FIG. 2 is a detail view of the partition members of the vibratory conveyor of FIG. 1.
Figure 3:
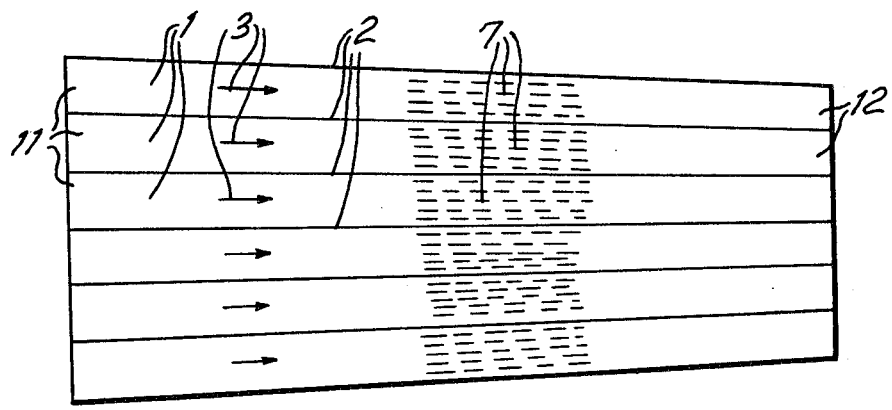
FIG. 3 is a plan view of the vibratory conveyor illustrated in FIG. 1.

Referring now to the drawings wherein like reference characters designate identical or corresponding parts throughout the several views, FIGS. 1 and 3 illustrate a vibratory conveyor arranged to transport bulk material, such as lime or coal, during thermal treatment thereof. Partition members 2 extend between the entry or feed side 11 and discharge side 12 of the conveyor, i.e., in the direction of transport of the bulk material, and divide the conveyor into a plurality of channels 1. The partition members 2 are illustrated in FIGS. 1 and 3 as substantially planar members while reference is made to FIG. 2, discussed below, wherein the partition members are illustrated in greater detail.

Referring now to FIG. 2, a detail view of the partition members 2 of the vibratory conveyor illustrated in FIG. 1 is shown. The partition members 2 generally have a wavy or undulating cross sectional configuration defined by vertically alternating protruding portions 5 and depressed portions 6, each of which extends in the direction of transport of the bulk material. In the illustrated preferred embodiment, the partition members 2 are constructed as "fin-tube" walls. More particularly, the partition members 2 each comprise a substantially planar member in which a plurality of tubes are arranged in a vertically spaced manner and which extend in the direction of transport of the bulk material so that the protruding portions 5 are consituted by tubes while the depressed portions 6 are constituted by the spaces between vertically adjacent tubes. The portions of the planar member extending between pairs of vertically adjacent tubes act as fins during the heat exchange operation as described below.

In the transport of the bulk material through the vibratory conveyor illustrated in FIG. 1, the bulk material is lifted in a vertical direction indicated by the arrows 4 through the vibrational movement of the conveyor. During such lifting of the bulk material, the portions thereof situated at the edge regions of the respective channels, strike against one of the protruding portions of a respective partition member 2 and rebound therefrom towards the central region of the respective channel in which it is located. Thus, referring to the dash lines 13 illustrated in FIG. 2, two particles are shown rebounding from respective protruding portions of the partition members 2. Such rebounding movement results in an intimate mixing of the bulk material and, at the same time, insures a uniform heating or cooling of the bulk material in the channel which in turn insures a relatively uniform temperature of the bulk material in its entirety as the same is discharged from the conveyor or chute.

As noted above, a thermal transfer medium is directed through the tubes defining the partition members during the transport of the bulk material through the channels. It is of course understood that the "fin-tube" wall construction of the illustrated preferred embodiment can be replaced by other constructions such, for example, as heat-exchanger plates through which the thermal transfer fluid can be carried. In any event, the thermal fluid carried by the partition members will transfer heat to the bulk material as the same is transported through the channels in amounts which are greater than the respective amounts of heat which can be delivered to the bulk material through the bottom surface or wall of the conveyor.

Thus, by virtue of the intimate mixing of the bulk material provided by the particular configuration of the partition members, the height of the bed of the bulk material can be made larger than is otherwise possible in conventional vibratory conveyors, a more uniform heating or cooling of the bulk material is accomplished and the duration of the time during which the bulk material contacts the heat treatment device can be more fully controlled, all of which contribute to increase the throughput of the apparatus of the present invention relative to conventional apparatus.

Referring again to FIG. 3, the vibratory conveyor of FIG. 1 is illustrated in plan view. A sifting or filtering path 7 is provided in each of the channels 1 defined between opposed partition members 2, the sifting paths 7 being provided substantially centrally between the entry and discharge sides 11, 12 of the conveyor. As the bulk material is transported through the channels 1, the fine-grained material can be separated from the coarse-grained material by means of such sifting paths. Such sifting paths can generally comprise a plurality of screens located close to one another. As further seen in FIG. 3, the cross-sectional area of each of the channels 1 decreases in size in the direction of transport of the bulk material between the entry and discharge sides 11, 12 of the conveyor. In this manner, the density of the vibrated bulk material located at the discharge side 12 is increased. This in turn results in less dust being generated in the region of the discharge side 12 which of course constitutes the point at which the bulk material is transferred.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In vibratory conveyor apparatus for transporting bulk material, such as lime or coal, in a stream from an entry or feed side to a discharge side and including means for thermally treating the bulk material as the same is transported through the apparatus, the improvement comprising, said thermal treatment means being constituted by a plurality of vertical partition members provided in said vibratory conveyor apparatus, each extending in the direction in which the stream of bulk material is transported, so as to define between them a plurality of channels, said plurality of vertical partition members constituting means for dividing the bulk material stream into parallel partial streams separated from each other over at least a part of the length of the vibratory conveyor apparatus, and means operatively associated with said vertical partition members for carrying a thermal transfer fluid therein, and further including means for screening the fine portion of the bulk material disposed in said plurality of channels between said feed and discharge sides.

2. The combination of claim 1 wherein said screening means are disposed in the substantially central region of said channels.

3. The combination of claim 2 wherein said partition members are arranged in a manner such that the cross-section of said channels in a plane transverse to the transport direction decreases in the transport direction.

* * * * *